US011416125B2

(12) United States Patent
Wayne et al.

(10) Patent No.: US 11,416,125 B2
(45) Date of Patent: Aug. 16, 2022

(54) RUNTIME-GENERATED DASHBOARD FOR ORDERED SET OF HETEROGENOUS EXPERIENCES

(71) Applicant: Oracle International Corporation, Redwood Shores, CA (US)

(72) Inventors: Allison Marie Wayne, Wakefield, MA (US); Sherry Mead, San Francisco, CA (US); Lancy Jude Silveira, Foster City, CA (US); Hillel Noah Cooperman, Seattle, WA (US); Kathleen Maguire Candland, San Francisco, CA (US); Carmen Ximena D'Arlach, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/923,985

(22) Filed: Jul. 8, 2020

(65) Prior Publication Data

US 2021/0081087 A1    Mar. 18, 2021

Related U.S. Application Data

(60) Provisional application No. 62/900,165, filed on Sep. 13, 2019.

(51) Int. Cl.
*G06F 3/0484* (2022.01)
*G06F 16/2457* (2019.01)
*G06F 9/451* (2018.01)

(52) U.S. Cl.
CPC ............ *G06F 3/0484* (2013.01); *G06F 9/451* (2018.02); *G06F 16/24578* (2019.01)

(58) Field of Classification Search
CPC ... G06F 3/0484; G06F 9/451; G06F 16/24578
See application file for complete search history.

(56) References Cited

U.S. PATENT DOCUMENTS

| | | | | |
|---|---|---|---|---|
| 10,496,705 | B1 * | 12/2019 | Irani | .................. H04L 51/18 |
| 2018/0144022 | A1 | 5/2018 | Rohde | ................ G06F 16/9535 |
| 2019/0206087 | A1 * | 7/2019 | Noll | ...................... G06F 3/0481 |
| 2019/0378071 | A1 * | 12/2019 | Xu | .................. G06Q 10/063116 |

* cited by examiner

*Primary Examiner* — Sherrod L Keaton
(74) *Attorney, Agent, or Firm* — Invoke (57) ABSTRACT

Techniques for displaying a runtime-generated dashboard to a user are disclosed. A system receives user information regarding a user accessing a system and determine a plurality of system features available to the user based on the user information. The system assigns each of the plurality of system features a rank and orders the plurality of system features based on respective assigned ranks. The system displays a dashboard comprising multiple shortcuts corresponding respectively to the plurality of system features. The shortcuts are ordered based on ranks of respective corresponding system features. Concurrently with displaying the shortcuts, the system displays a heterogeneous plurality of interface elements corresponding respectively to the plurality of system features. Each interface element visually indicates a type of interaction associated with the respective system feature. At least two of the plurality of system features are associated with different types of interactions.

20 Claims, 4 Drawing Sheets

RUNTIME-GENERATED DASHBOARD FOR ORDERED SET OF HETEROGENOUS EXPERIENCES

INCORPORATION BY REFERENCE; DISCLAIMER

This application is hereby incorporated by reference: application No. 62/900,165 filed on Sep. 13, 2019. The Applicant hereby rescinds any disclaimer of claim scope in the parent application or the prosecution history thereof and advises the USPTO that the claims in this application may be broader than any claim in the parent application.

TECHNICAL FIELD

The present disclosure relates to a dashboard display. In particular, the present disclosure relates to displaying a graphical user dashboard that identifies the types of interactions corresponding to different system features.

BACKGROUND

A dashboard (also referred to herein as a springboard) is a type of graphical user interface displayed by a system which may provide at-a-glance views of information relevant to a particular user objective or business process, as well as providing links to one or more features associated with the system, one or more user notifications, and/or the like.

The dashboard is typically displayed on a web page which may be linked to at least one database to provide access to system features. For example, a manufacturing dashboard may show information related to productivity such as number of parts manufactured, or number of failed quality inspections per hour. Similarly, a human resources dashboard may show numbers related to staff recruitment, retention and composition, for example number of open positions, or average days or cost per recruitment.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. DASHBOARD MANAGEMENT SYSTEM
3. DISPLAYING A RUNTIME-GENERATED DASHBOARD TO A USER
4. EXAMPLE EMBODIMENT
5. MISCELLANEOUS; EXTENSIONS
6. HARDWARE OVERVIEW

1. General Overview

One or more embodiments display a dashboard that includes shortcuts to system features that are relevant to a user. Features, as referred to herein, may include, but are not limited to: applications, processes, and data sets generated at runtime based on a current set of information. A system for displaying a runtime-generated dashboard to a user may determine that a user has performed an action that triggers displaying of the dashboard. In response, the system may determine which system features the user is permitted to access and may rank those features. Features may be ranked, for example, based on relevance to the user, based on usage by others, based on a time of day, etc. The system may further associate each of the system features with one of a heterogeneous set of icons. Each icon of the heterogenous set of icons is indicative of a type of user experience corresponding to the feature associated with the icon. As an example, an icon may represent a conversational User Interface (UI). A conversational UI allows a user to input data and obtain information using a natural language. As another example, the icon may represent a non-conversational UI such as a listing. A listing presents data as a list. The system may display, as a part of the dashboard, an ordered list of shortcuts based on the ranked system features, together with the assigned icon for each of those system features.

One or more embodiments described in this Specification and/or recited in the claims may not be included in this General Overview section.

2. Dashboard Management System

Figure 1:
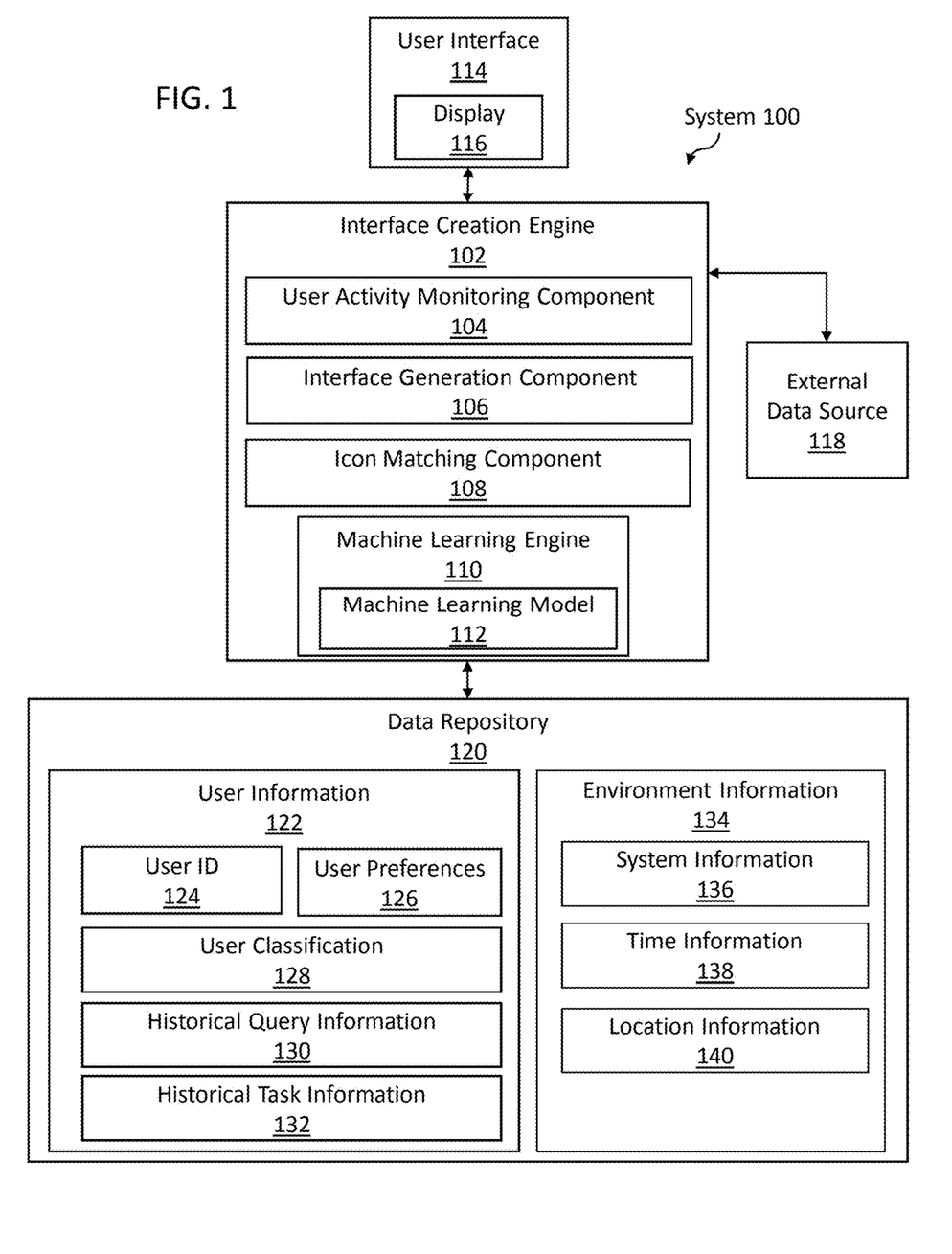
FIG. 1 illustrates a system in accordance with one or more embodiments.

FIG. 1 illustrates a system 100 in accordance with one or more embodiments. As illustrated in FIG. 1, system 100 includes an interface creation engine 102, a user interface 114, an external data source 118, a data repository 120, and various components thereof. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, the user interface 114 refers to hardware and/or software configured to facilitate communications between a user and the interface creation engine 102. The user interface 114 may be used by a user who accesses an interface (e.g., a dashboard interface) for work and/or personal activities. The user interface 114 may be associated with one or more devices for presenting visual media, such as a display 116, including a monitor, a television, a projector, and/or the like. User interface 114 renders user interface elements and receives input via user interface elements. Examples of interfaces include a graphical user interface (GUI), a command line interface (CLI), a haptic interface, and a voice command interface. Examples of user interface elements include checkboxes, radio buttons, drop-down lists, list boxes, buttons, toggles, text fields, date and time selectors, command lines, sliders, pages, and forms.

In an embodiment, different components of the user interface 114 are specified in different languages. The behavior of user interface elements is specified in a runtime-generated programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the user interface 114 is specified in one or more other languages, such as Java, C, or C++.

In one or more embodiments, an interface creation engine 102 refers to hardware and/or software configured to perform operations described herein for displaying a runtime-generated dashboard to a user. Examples of operations for displaying a runtime-generated dashboard to a user are described below with reference to FIG. 2.

In an embodiment, the interface creation engine 102 includes a user activity monitoring component 104. A user activity monitoring component 104 may refer to hardware and/or software configured to perform operations described herein (including such operations as may be incorporated by reference) for recognizing input from a user.

In an embodiment, the interface creation engine 102 includes an interface generation component 106. The interface generation component 106 may refer to hardware and/or software configured to generate an interface. As a particular example, the interface generation component 116 may be used to render an interface to a display for user interaction. The interface generation component 116 may present one or more icons and one or more interface components to the user.

In an embodiment, the interface creation engine 102 includes an icon matching component 108. The icon matching component 108 may refer to hardware and/or software configured to match an icon to an interface component. In at least some embodiments, the icon matching component 108 may determine an interface type (e.g., a conversational user interface) associated with an interface component and provide match an icon to the interface component based on the interface type (e.g., associating a chat balloon icon with an interface component that uses a conversational user interface). For example, the icon matching component may match an interface component that uses a conversational user interface with an icon associated with conversational interfaces (e.g., a chat balloon icon). In some embodiments, the icon matching component 108 matches an icon with an interface component based on one or more characteristics of the function performed by activation of the interface component. For example, each function may be associated with a particular department in a company (e.g., sales, accounting, Information Technology (IT)/technical support, human resources, etc.), and the function may be associated with a particular icon based on the department with which the function is associated (e.g., a dollar sign for accounting functions, a portfolio for sales functions, a computer for IT/technical support functions). In some embodiments, one or more of the interface components can be associated with a particular icon to provide a special significance to the interface component. For example, a specific icon may be designated for use only with the interface component used to submit a timesheet, to draw attention to the particular interface component.

In an embodiment, one or more components of the query suggestion engine 102 use a machine learning engine 110. Machine learning includes various techniques in the field of artificial intelligence that deal with computer-implemented, user-independent processes for solving problems that have variable inputs.

In some embodiments, the machine learning engine 110 trains a machine learning model 112 to perform one or more operations. Training a machine learning model 112 uses training data to generate a function that, given one or more inputs to the machine learning model 112, computes a corresponding output. The output may correspond to a prediction based on prior machine learning. In an embodiment, the output includes a label, classification, and/or categorization assigned to the provided input(s). The machine learning model 112 corresponds to a learned model for performing the desired operation(s) (e.g., labeling, classifying, and/or categorizing inputs). An interface creation engine 102 may use multiple machine learning engines 110 and/or multiple machine learning models 112 for different purposes.

In an embodiment, the machine learning engine 110 may use supervised learning, semi-supervised learning, unsupervised learning, reinforcement learning, and/or another training method or combination thereof. In supervised learning, labeled training data includes input/output pairs in which each input is labeled with a desired output (e.g., a label, classification, and/or categorization), also referred to as a supervisory signal. In semi-supervised learning, some inputs are associated with supervisory signals and other inputs are not associated with supervisory signals. In unsupervised learning, the training data does not include supervisory signals. Reinforcement learning uses a feedback system in which the machine learning engine 110 receives positive and/or negative reinforcement in the process of attempting to solve a particular problem (e.g., to optimize performance in a particular scenario, according to one or more predefined performance criteria). In an embodiment, the machine learning engine 110 initially uses supervised learning to train the machine learning model 112 and then uses unsupervised learning to update the machine learning model 112 on an ongoing basis.

In an embodiment, a machine learning engine 110 may use many different techniques to label, classify, and/or categorize inputs. A machine learning engine 110 may transform inputs into feature vectors that describe one or more properties ("features") of the inputs. The machine learning engine 110 may label, classify, and/or categorize the inputs based on the feature vectors. Alternatively or additionally, a machine learning engine 110 may use clustering (also referred to as cluster analysis) to identify commonalities in the inputs. The machine learning engine 110 may group (i.e., cluster) the inputs based on those commonalities. The machine learning engine 110 may use hierarchical clustering, k-means clustering, and/or another clustering method or combination thereof. In an embodiment, a machine learning engine 110 includes an artificial neural network. An artificial neural network includes multiple nodes (also referred to as artificial neurons) and edges between nodes. Edges may be associated with corresponding weights that represent the strengths of connections between nodes, which the machine learning engine 110 adjusts as machine learning proceeds. Alternatively or additionally, a machine learning engine 110 may include a support vector machine. A support vector machine represents inputs as vectors. The machine learning engine 110 may label, classify, and/or categorizes inputs based on the vectors. Alternatively or additionally, the machine learning engine 110 may use a naïve Bayes classifier to label, classify, and/or categorize inputs. Alternatively or additionally, given a particular input, a machine learning model may apply a decision tree to predict an output for the given input. Alternatively or additionally, a machine learning engine 110 may apply fuzzy logic in situations where labeling, classifying, and/or categorizing an input among a fixed set of mutually exclusive options is impossible or impractical. The aforementioned machine learning model 112 and techniques are discussed for exemplary purposes only and should not be construed as limiting one or more embodiments.

For example, the machine learning engine 110 may receive, as inputs, user information and/or environment information. The machine learning engine 110 may determine an ordering of a plurality of user interface elements in the interface based at least on the input user information and/or environment information. In particular, the interface creation engine may use the machine learning engine 110 to order the interface elements.

In embodiments, the machine learning engine 110 may receive, as inputs, historical task information indicating tasks executed by one or more users, together with time information indicating a time and date at which the user executed the task. The machine learning engine 110 may process the historical task information to determine one or more patterns in times the tasks are performed, and which system features are utilized to perform the tasks.

In an embodiment, as a machine learning engine 110 applies different inputs to a machine learning model 112, the corresponding outputs are not always accurate. As an example, the machine learning engine 110 may use supervised learning to train a machine learning model 112. After training the machine learning model 112, if a subsequent input is identical to an input that was included in labeled training data and the output is identical to the supervisory signal in the training data, then output is certain to be accurate. If an input is different from inputs that were included in labeled training data, then the machine learning engine 110 may generate a corresponding output that is inaccurate or of uncertain accuracy. In addition to producing a particular output for a given input, the machine learning engine 110 may be configured to produce an indicator representing a confidence (or lack thereof) in the accuracy of the output. A confidence indicator may include a numeric score, a Boolean value, and/or any other kind of indicator that corresponds to a confidence (or lack thereof) in the accuracy of the output.

In an embodiment, the interface creation engine 102 is configured to receive data from one or more external data sources 118. An external data source 118 refers to hardware and/or software operating independent of the interface creation engine 102. For example, the hardware and/or software of the external data source 118 may be under control of a different entity (e.g., a different company or other kind of organization) than an entity that controls the query suggestion engine. An external data source 118 may supply data associated with a pool of candidate tasks from which the interface creation engine 102 may derive an ordered list of tasks.

Some examples of an external data source 118 supplying data to the interface creation engine 102 include, but are not limited to a software developer that provides candidate suggested queries related to most recent software updates, a training company that provides candidate suggested queries based on common issues encountered with software training, and the like. Many different kinds of external data sources 118 may supply many different kinds of data.

In an embodiment, the interface creation engine 102 is configured to retrieve data from an external data source 118 by 'pulling' the data via an application programming interface (API) of the external data source 118, using user credentials that a user has provided for that particular external data source 118. Alternatively or additionally, an external data source 118 may be configured to 'push' data to the interface creation engine 102 via an API of the interface creation engine, using an access key, password, and/or other kind of credential that a user has supplied to the external data source 118. The interface creation engine 102 may be configured to receive data from an external data source 118 in many different ways.

In one or more embodiments, a data repository 120 is any type of storage unit and/or device (e.g., a file system, database, collection of tables, or any other storage mechanism) for storing data. Further, a data repository 120 may include multiple different storage units and/or devices. The multiple different storage units and/or devices may or may not be of the same type or located at the same physical site. Further, a data repository 120 may be implemented or may execute on the same computing system as the interface creation engine 102 and/or the external data source 118. Alternatively or additionally, a data repository 120 may be implemented or executed on a computing system separate from the interface creation engine 102 and/or the external data source 118. A data repository 120 may be communicatively coupled to the query system 102 and/or the external data source 118 via a direct connection or via a network.

User information 122 may be implemented across any of components within the system 100. However, this information is illustrated within the data repository 120 for purposes of clarity and explanation. As illustrated in FIG. 1, the user information 122 may comprise a user identifier 124, one or more user preferences 126, a user classification 128, historical query information 130 associated with the user, and historical task information 132 associated with the user. In one or more embodiments, the user information 122 may comprise, more fields, fewer fields, or different fields.

The user identifier 124 may be a character string that uniquely identifies exactly one user. The user preferences 126 may comprise one or more characteristics of a user. As examples, the user preferences may include features such as user age, employee start date, preferred contact methods, etc. The user classification 128 may comprise one or more groups to which a user belongs. As examples, the classification may be by user seniority (e.g., new employees, senior employees, etc.), by functional group (e.g., human resources employees, marketing employees, accounting employees, etc.), and/or any other classification. The historical query information 130 may comprise a log other data repository comprising queries the user has previously submitted. In some embodiments the historical query information 130 may store all queries submitted by a user. Alternatively, in some embodiments the historical query information 130 may be limited to a predefined number of queries (e.g., the 100 most recently submitted queries) and/or a particular time period (e.g., queries submitted in the preceding six months). In one or more embodiments, the historical query information may further comprise time information (e.g., date and time) related to when each stored query was submitted. The historical task information 132 may comprise a log other data repository comprising tasks the user has previously executed. In some embodiments the historical task information 132 may store all tasks executed by a user. Alternatively, in some embodiments the historical task information 132 may be limited to a predefined number of executed tasks (e.g., the 100 most recently executed tasks) and/or a particular time period (e.g., tasks executed in the preceding six months). In one or more embodiments, the historical task information may further comprise time information (e.g., date and time) related to when each stored task was executed. In embodiments, the historical task information includes tasks executed by all users of the system.

Environment information 134 may be implemented across any of components within the system 100. However, this information is illustrated within the data repository 120 for purposes of clarity and explanation. Environment information 134 may include any information related to the computing environment. As illustrated in FIG. 1, the environment information 134 may comprise one or more of system information 136, time information 138, and location information 140. In one or more embodiments, the environment information 134 may comprise, more fields, fewer fields, or different fields.

The system information 136 may comprise information regarding the hardware and/or software of the system 100. For example, the system information 136 may indicate one or more features of the software being used by the system 100, hardware incorporated into the system 100, and/or the like. Time information 138 may comprise information related to the date, day of week, time of day, and/or the like. The location information 140 may include information related to a location of the system 100 and/or a device used to access the system 100. The location information may be absolute location information, such as that provided by a global positioning system. Alternatively or additionally, the location information 140 may be relative location information, such as a determination of distance from one or more wireless transceivers (e.g., wireless triangulation). In embodiments, the location information 140 may include information regarding a particular location at which a task is to be performed.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Displaying a Runtime-Generated Dashboard to a User

Figure 2:
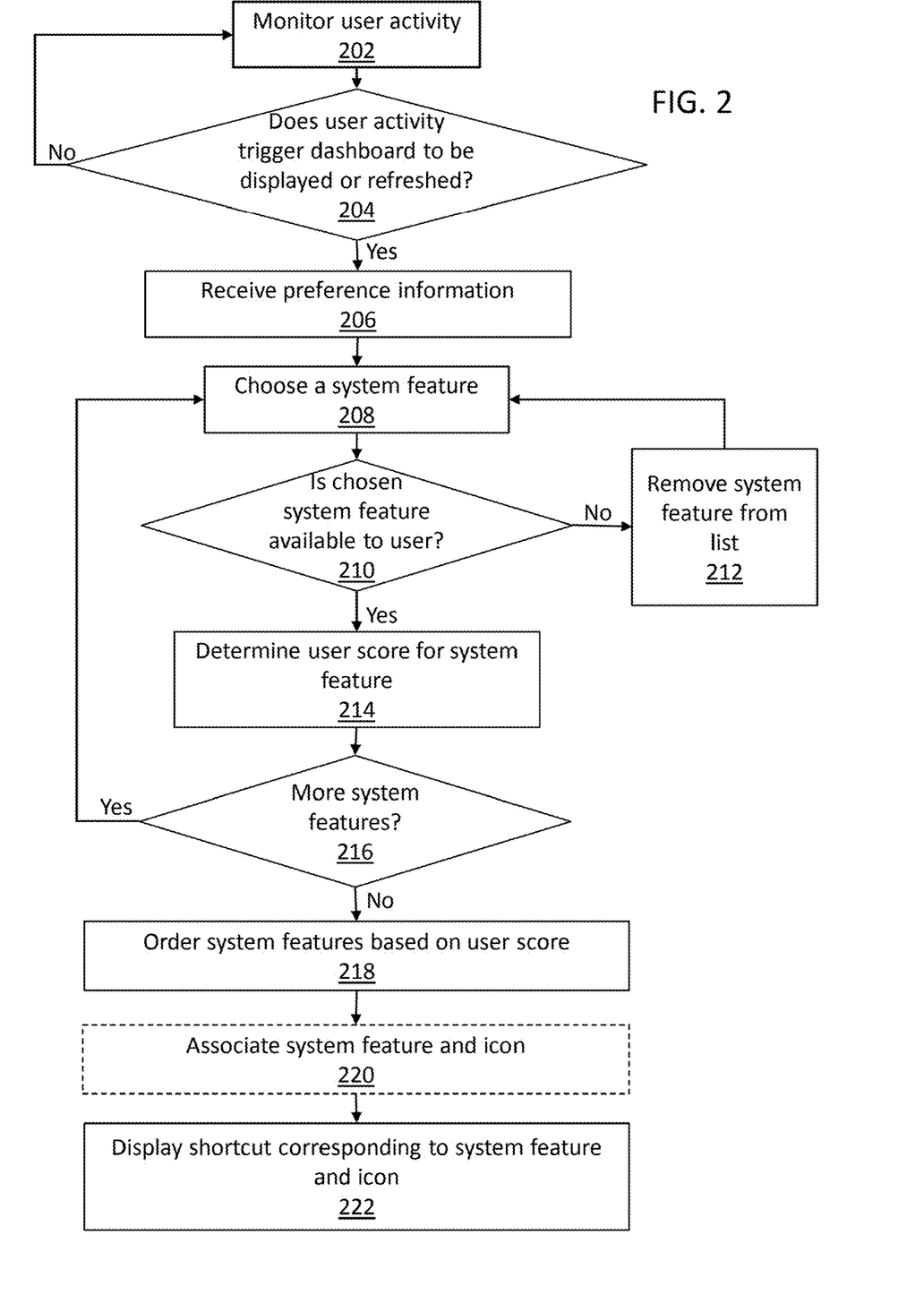
FIG. 2 illustrates an example set of operations for displaying a runtime-generated dashboard in accordance with one or more embodiments.

FIG. 2 illustrates an example set of operations for displaying a runtime-generated dashboard to a user in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

One or more embodiments monitor a user's activity (Operation 202). For example, the system may track a user logging into a system. The system may track commands issued by a user. As examples, the system may track commands to "Reload" a page or go "Back" to a previously displayed page.

In some embodiments, the system determines whether the user activity triggers a dashboard to be displayed or refreshed (Operation 204). As an example, the system determines that user activity triggers the dashboard to be displayed if the user navigates to an application interface corresponding to the dashboard. The user may log-in, select refresh/reload, or submit a "back" command to navigate to the application interface corresponding to the dashboard. The system may detect user selection of a shortcut for the application interface corresponding to the dashboard.

In some embodiments, in response to determining that user activity has triggered refreshing the dashboard, the system may identify preference information (Operation 206). Identifying preference information may include receiving data that is automatically "pushed" to the system from a data repository and/or other external data source. Alternatively or additionally, receiving preference information may comprise requesting data from one or more data repositories and/or external data sources.

The preference information may include user information of a user operating the system, user information of one or more users who share at least one characteristic of the user operation the system (e.g., users having the same user classification), environment information, including one or more of system information or time information, information derived from any of the above (e.g., via a machine learning engine), and/or the like. In embodiments, the user information includes one or more of a user identifier, a user classification, historical query information associated with the user identifier and/or the user classification, historical task information associated with the user identifier and/or the use classification, and one or more user preference settings. In embodiments, the environment information includes one or more of system information, time information, and location information.

In an embodiment, the system may retrieve a list of system features that are made available via the dashboard. The system may select one of the system features for user access analysis and scoring (Operation 208). The selected system feature may be determined randomly or pseudo-randomly, via an ordered list, or by any other means. The system may determine if the user is permitted to access to the selected system feature (Operation 210). Determining if the user should have access to the system feature may include determining any user requirements for accessing the system feature and comparing the received user information to determine if the user meets the requirements. If the user is not permitted to access the selected system feature, the feature may be removed from the list (Operation 212) and the system may select a new feature (e.g., return to Operation 208).

In an embodiment, if the user is permitted to access the system feature, a user score or rank may be associated with the system feature (Operation 214). The user score may be determined based on one or more of: relevance of the feature to the user, the likelihood that the system feature represents the next action the use is expected to take, the frequency with which the user has accessed the system feature in the past, determining how similar users have accessed the system feature, and/or the like. In some embodiments, the user score may be stored in association with the corresponding system feature.

The user score may be based, at least in part, on user information. In at least some embodiments, the user score is based on user information. For example, the user score can be based on historical feature information associated with the user identifier and/or the user classification (e.g., other users in the same category as the user identifier). In at least some embodiments, the user score is based on historical query information. For example, features related to recent queries can have increased user scores.

Alternatively or additionally, the user score may be based, at least in part, on environmental information. In at least some embodiments, the user score is based on time information. For example, features related to billing can have a higher score at the beginning of a month, features related to submitting timesheets can have a higher score on a day that timesheets are due, and/or the like. In at least some embodiments, the user score is based on location information. For example, a user location can be tracked, and features associated with a location near a user location can have a user score higher than features associated with a location far from a user location.

As a particular example of basing the user score on environmental information, the user score may be based on system information. The system information may include, for example, a device type associated with a device on which the user is accessing the system and/or information indicative of one or more features present on a device on which the user is accessing the system. For example, when a user is on a tablet or smartphone device having a camera and no physical keyboard, features that require a camera can have higher user scores, and features that require significant data entry can have lower user scores. In some embodiments, the system may include historical data indicating a device type associated with interacting with a particular system feature. Responsive to a user accessing the system with a particular device type, the system may increase user scores of features associated with the particular device type.

In an embodiment the system may then determine if any additional system features need to be evaluated (Operation 216). If there are additional features, the system may choose a new system feature to analyze (e.g., return to Operation 208).

In an embodiment, when it is determined that there are no additional features to analyze, the system may order the system features based on their corresponding user scores (Operation 218). In some embodiments, the system features may be organized into an ordered list or other similar data structure.

In an embodiment the system may determine, for each system feature, whether the system feature has been associated with a particular icon. If no icon has been associated with a particular system feature, the system may associate an icon with the system feature (Operation 220). In embodiments, the associated icons may be selected from a heterogeneous plurality of icons. Each of the icons may be associated with a system feature based on one or more characteristics of the system feature.

In some embodiments, the associated icon may be an indication of how the system feature behaves. For example, features that initiate an automated chat function may be associated with a word bubble icon, features that involve creation of a new data item or data structure (e.g., an expense, a marketing campaign, etc.) may be associated with a plus sign icon, features that relate to a person (e.g., a directory listing) may be associated with a person icon, and so on. In some embodiments, the associated icons may be indicative of a department associated with each system feature. For example, a dollar sign icon may be associated with system features related to the finance department, a person icon may be associated with system features related to the human resources department, and so on. Those of skill in the art will appreciate that more and/or different associates may be made without departing form the scope of this invention.

In an embodiment the system may refresh the dashboard display by displaying shortcuts corresponding to the system features and simultaneously displaying icons indicating the type of interface for accessing the system features (operation 222). The system may display the shortcuts in the order assigned to their corresponding system features. In some embodiments, the system may display a shortcut and corresponding icon associated with each system feature on the list of system features. Alternatively, the system may display up to a fixed number of shortcuts and corresponding icons. For example, the system may display shortcuts and icons associated with the ten highest ranked system features. As another alternative, the system may display shortcuts and icons for system features that exceed a threshold user score. For example, if the highest possible user score is 100, the system may display shortcuts and icons for system features having a score that exceeds 50.

In at least some embodiments, a particular system feature is accessible via multiple types of interface. For example, a particular system feature may be accessible via both a conversational interface and a non-conversational interface. Accordingly, multiple shortcuts may exist for accessing the system feature (e.g., a separate shortcut may exist for each interface by which the system feature is accessible).

In some embodiments, the system may display multiple icons for the particular feature, each icon corresponding to a type of interface by which the feature can be accessed, thereby allowing a user to select the type of interface for accessing the system feature or dataset. For example, each icon may comprise a shortcut to an associated interface for accessing the particular feature, such that interacting with (e.g., clicking) an icon causes the system to access the particular feature via the associated interface. As another example, the particular feature can be associated with a shortcut that requires the user to select an interface from among the multiple interface types via which the particular system feature is accessed (e.g., clicking the shortcut causes the system to ask the user whether they wish to access the system feature via a conversational interface or a non-conversational interface). As a particular example, a feature such as "Schedule Vacation" may be accessible via both a conversational interface and a non-conversational interface. A dashboard may include the text "Schedule Vacation" associated with a first icon that indicates a conversational interface and a second icon that indicates a non-conversational interface. Interacting with (e.g., clicking on) the first icon may cause the system to instantiate a conversational interface through which the user can schedule a vacation. Interacting with (e.g., clicking on) the second icon may cause the system to instantiate a non-conversational interface to redirect the user to a website for scheduling vacation time.

Each of the shortcuts, when activated by a user, can cause the system to perform an action associated with the corresponding system feature. As an example, activating a link, of the plurality of links on the dashboard, can cause the system to display additional dashboard information. As another example, activating a link, of the plurality of links on the dashboard, can cause the system to initiate an automated conversational interface. As another example, activating a link, of the plurality of links on the dashboard, can cause the system to display a list comprising additional data retrieved based on the user activation of the link. As an example, activating a link, of the plurality of links on the dashboard, can cause the system to execute one or more applications. There are many actions that can occur as a result of activation of a link on the dashboard.

In other embodiments, the system may compute separate ranks for each of the shortcuts by which the system feature is accessible. The system may select the shortcut associated with the highest ranking, from among the shortcuts associated with the system feature, for display in the dashboard. The selected shortcut may be positioned on the dashboard based on its rating, while the non-selected shortcuts are suppressed (e.g., are not included in the dashboard). In this way, a user is presented with a single shortcut for accessing the system feature, and the dashboard icon associated with the selected shortcut. This may be helpful for simplifying the dashboard interface (e.g., when screen real estate is scarce and/or to minimize choices presented to a user).

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3:
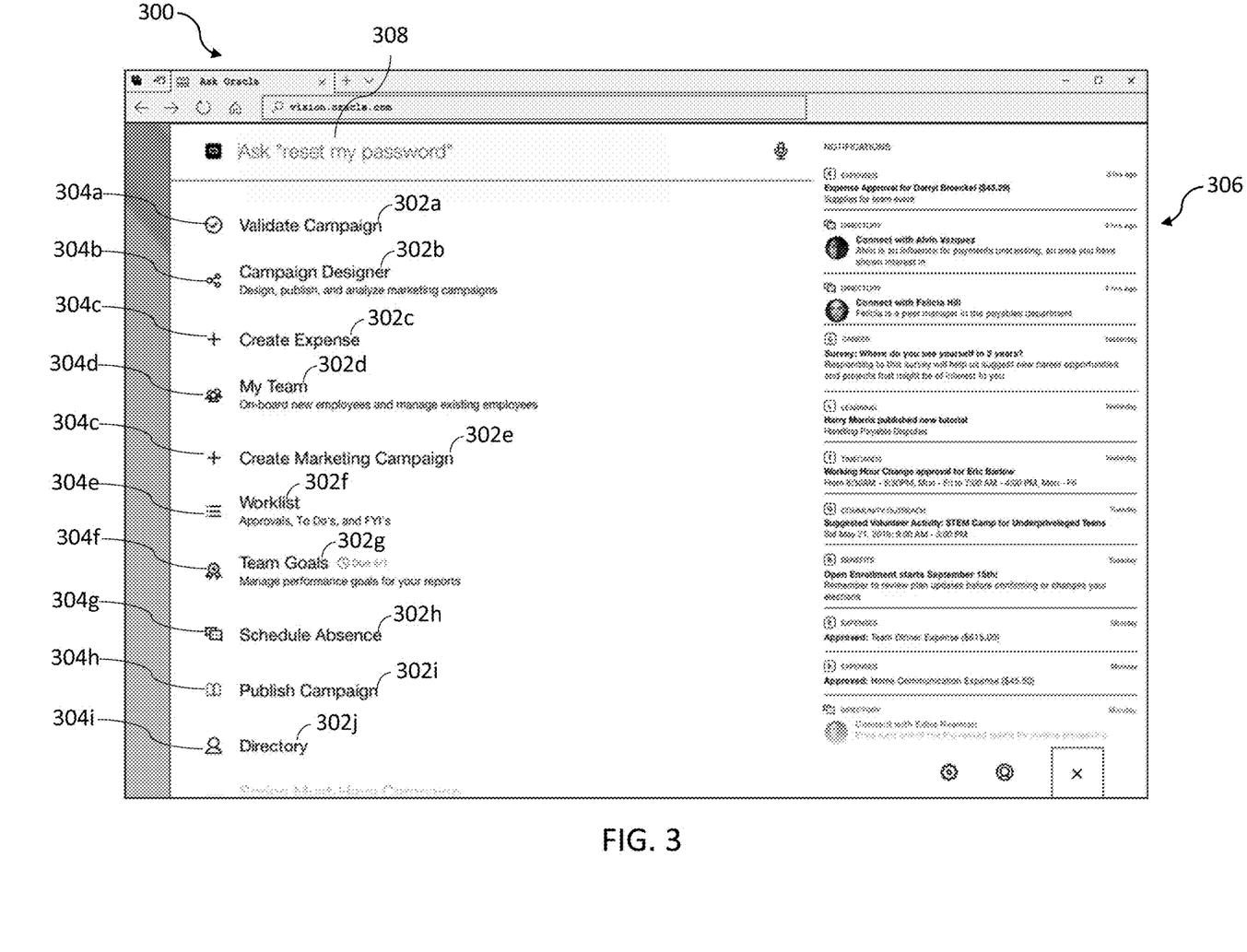
FIG. 3 shows an example of a runtime-generated dashboard in accordance with one or more embodiments.

FIG. 3 shows an example dashboard 300, including a plurality of shortcuts 302a-302j (collectively, shortcuts 302) and icons 304a-304i (collectively, icons 304). In the example shown in FIG. 3, Each shortcut 302 is associated with a particular icon 304. Each of the shortcuts 302 is associated with a particular instance of an icon 304. The association of the icon 304 with the shortcut 302 provides information to the user regarding the feature with which the icon is associated.

As shown in the example dashboard 300, the system feature shortcut 302a includes the text "Validate Campaign" and has been associated with an instance of a check mark icon 304a, which is indicative of checking existing data. The feature shortcut 302b includes the text "Campaign Designer" and is associated with an instance of a linking icon 304b indicative of feature design tools. The feature shortcut 302c includes the text "Create Expense" and is associated with an instance of a plus ("+") icon 304c indicating creation of new data. The feature shortcut 302d includes the text "My Team" and is associated with an instance of a multi-person icon 304d indicating a team. The feature shortcut 302e includes the text "Create Marketing Campaign" and is associated with another instance of the plus ("+") icon 304c. The feature shortcut 302f includes the text "Worklist" and is associated with an instance of a bulleted list icon 304e that is indicative of a listing of information. The feature shortcut 302g includes the text "Team Goals" and is associated with an instance of a medal icon 304f that is indicative of goal information. The feature shortcut 302h includes the text "Schedule Absence" and is associated with an instance of a chat balloon icon 304g, indicating that this system feature uses a conversational interface with which the user interacts. The feature shortcut 302i includes the text "Publish Campaign" and is associated with an instance of a book icon 304h indicating publishing activities. The feature shortcut 302j includes the text "Publish Campaign" and is associated with an instance of a person icon 304i indicating personal information.

As shown in FIG. 3, the shortcuts 302 appear in an ordered list. That is, the system has ordered the shortcuts 302 prior to displaying the list of shortcuts in the dashboard 300. In particular, the dashboard 300 includes the shortcut 302a, including the text "Validate Campaign" listed first, followed by the shortcut 302b, including the text "Campaign Designer" listed second, and the shortcut 302c, including the text "Create Expense" listed third and then additional shortcuts. Accordingly, the system has determined that the system feature of "Validate Campaign" is the most relevant to the user at the present time (e.g., the feature "Validate Campaign" has the highest user score), followed by the feature "Campaign Designer," the feature "Create Expense," and the additional features associated with the additional shortcuts.

As shown in FIG. 3, the dashboard 300 may include additional features. For example, the dashboard 300 includes a notification and/or announcement column 306, including notifications. In the example dashboard 300, the notifications are arranged chronologically. Alternative arrangements (e.g., by relevance) are also contemplated. Additionally or alternatively, the dashboard 300 may include a text entry field 308 for entering a text query. The dashboard 300 may include many other features in addition to the ordered list of feature shortcuts and associated icons.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
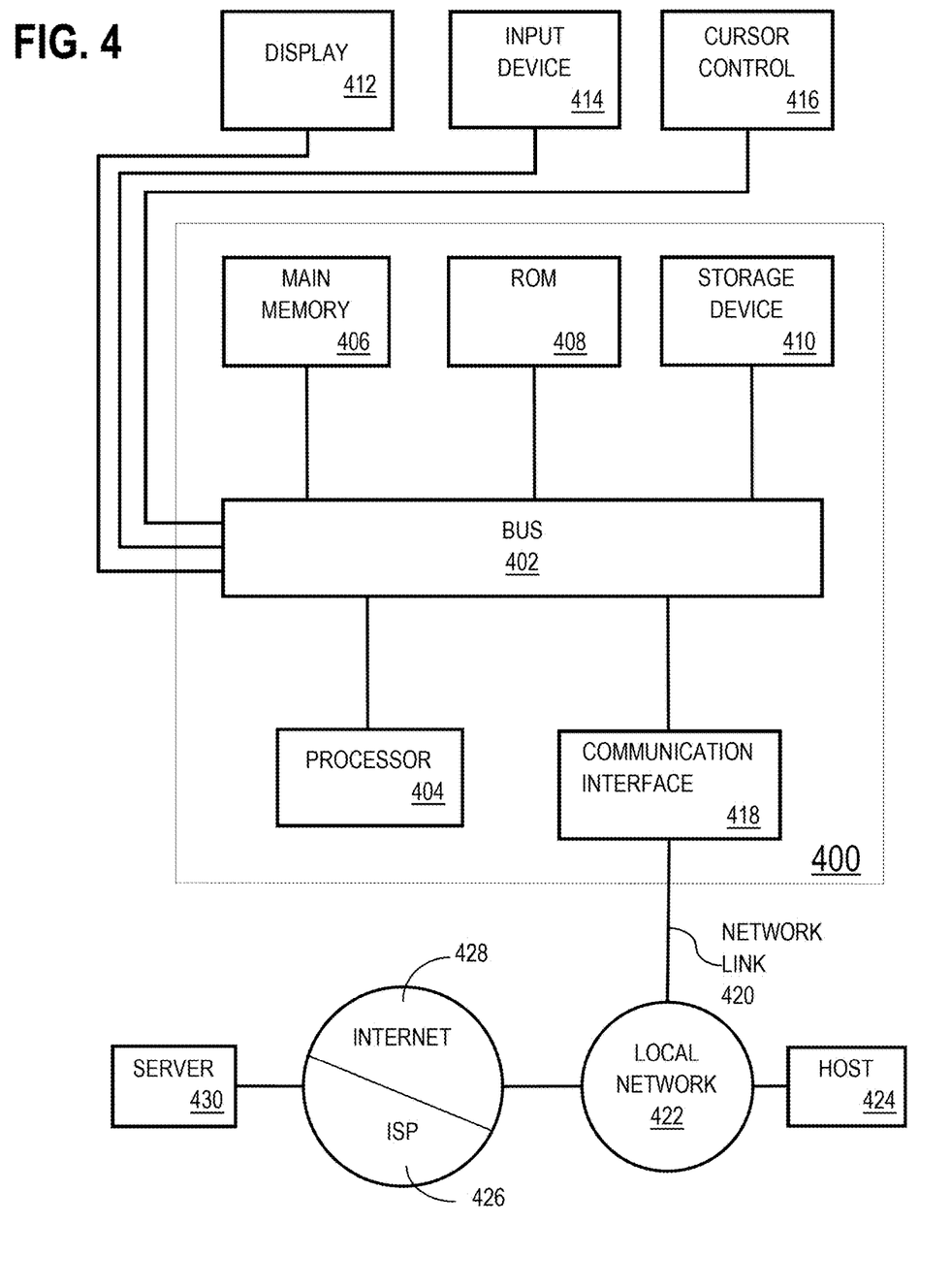
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other runtime-generated storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes runtime-generated memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its runtime-generated memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory media comprising instructions which, when executed by one or more hardware processors, causes performance of operations comprising:
   receiving user information including a user classification regarding a user accessing a system;
   determining a plurality of system features that the user is permitted to access and at least one system feature the user is not permitted to access based at least in part on the user information including the user classification, wherein a first system feature of the plurality of system features is accessible through two or more user interfaces including (a) a conversational interface which allows inputting data and obtaining information using a natural language and (b) a non-conversational interface;
   generating, based at least in part on the user information including the user classification, a first set of ranks including a respective rank for each respective system feature of the plurality of system features that the user is permitted to access, wherein the at least one system feature the user is not permitted to access does not include a rank in the first set of ranks, wherein a plurality of shortcuts are selectable to access different interfaces of the plurality of system features, wherein each respective feature of the plurality of system features is associated with at least one shortcut of the plurality of shortcuts that, when selected, accesses the system feature;
   generating a second set of ranks including a respective rank for each respective shortcut of a subset of shortcuts, from the plurality of shortcuts, to different user interfaces of the two or more user interfaces through which the first system feature is accessible;
   displaying a dashboard comprising two or more shortcuts of the plurality of shortcuts for a subset of the plurality of system features, wherein the plurality of shortcuts include at least a first shortcut that, when selected, accesses the conversational interface of the first system feature and a second shortcut that, when selected, accesses the non-conversational interface of the first system feature, wherein the two or more shortcuts are selected based at least in part on which system features are highest ranked in the first set of ranks and which shortcuts to different users interfaces are highest ranked in the second set of ranks;
   concurrently with displaying the plurality of shortcuts, displaying a plurality of interface elements, each interface element of the plurality of interface elements visually indicating a type of interaction associated with a respective shortcut of the plurality of shortcuts,
   wherein a first interface element of the plurality of interface elements indicates that the first shortcut provides access to the conversational interface that accesses the first system feature;
   wherein a second interface element of the plurality of interface elements indicates that the second shortcut provides access to the non-conversational interface that accesses the first system feature.

2. The one or more non-transitory media of claim 1, wherein the first set of ranks is further based on an uncompleted task associated with the user specified in the user information.

3. The one or more non-transitory media of claim 1, wherein the first set of ranks is further based on a system feature accessed by the user specified in the user information.

4. The one or more non-transitory media of claim 1, wherein the first set of ranks is further based on a system feature accessed by one or more other users that share a characteristic of the user specified in the user information.

5. The one or more non-transitory media of claim 1, wherein the first set of ranks is further based on query data associated with the user specified in the user information.

6. The one or more non-transitory media of claim 1, wherein the non-conversational interface displays additional dashboard information.

7. The one or more non-transitory media of claim 1, wherein the non-conversational interface presents an interactive list that accesses the first system feature.

8. The one or more non-transitory media of claim 1, the operations further comprising: matching a first icon associated with conversational interfaces to the first shortcut and a second icon associated with non-conversational interfaces to the second shortcut.

9. The one or more non-transitory media of claim 1, wherein the first shortcut for the first system feature instantiates the conversational interface when selected and the second shortcut for the first system feature instantiates the non-conversational interface when selected.

10. The one or more non-transitory media of claim 1, the operations further comprising: suppressing at least one shortcut for the first feature based on the second set of ranks.

11. The one or more non-transitory media of claim 1, the operations further comprising: training a machine learning model to predict an optimal ordering of user interface elements based on user attributes; subsequent to training the machine learning model, applying the machine learning model to the user information to generate the first set of ranks.

12. The one or more non-transitory media of claim 1, the operations further comprising: updating the machine learning model based on feedback received from the user interacting with the dashboard.

13. A system comprising:
   at least one device including a hardware processor;
   the system being configured to perform operations comprising:
      receiving user information including a user classification regarding a user accessing a system;

determining a plurality of system features that the user is permitted to access and at least one system feature the user is not permitted to access based at least in part on the user information including the user classification, wherein a first system feature of the plurality of system features is accessible through two or more user interfaces including (a) a conversational interface which allows inputting data and obtaining information using a natural language and (b) a non-conversational interface;

generating, based at least in part on the user information including the user classification, a first set of ranks including a respective rank for each respective system feature of the plurality of system features that the user is permitted to access, wherein the at least one system feature the user is not permitted to access does not include a rank in the first set of ranks, wherein a plurality of shortcuts are selectable to access different interfaces of the plurality of system features, wherein each respective feature of the plurality of system features is associated with at least one shortcut of the plurality of shortcuts that, when selected, accesses the system feature;

generating a second set of ranks including a respective rank for each respective shortcut of a subset of shortcuts, from the plurality of shortcuts, to different user interfaces of the two or more user interfaces through which the first system feature is accessible;

displaying a dashboard comprising two or more shortcuts of the plurality of shortcuts for a subset of the plurality of system features, wherein the plurality of shortcuts include at least a first shortcut that, when selected, accesses the conversational interface of the first system feature and a second shortcut that, when selected, accesses the non-conversational interface of the first system feature, wherein the two or more shortcuts are selected based at least in part on which system features are highest ranked in the first set of ranks and which shortcuts to different users interfaces are highest ranked in the second set of ranks;

concurrently with displaying the plurality of shortcuts, displaying a plurality of interface elements, each interface element of the plurality of interface elements visually indicating a type of interaction associated with a respective shortcut of the plurality of shortcuts, wherein a first interface element of the plurality of interface elements indicates that the first shortcut provides access to the conversational interface that accesses the first system feature;

wherein a second interface element of the plurality of interface elements indicates that the second shortcut provides access to the non-conversational interface that accesses the first system feature.

14. The system of claim 13, wherein the first set of ranks is further based on an uncompleted task associated with the user specified in the user information.

15. The system of claim 13, wherein the first set of ranks is further based on a system feature accessed by the user specified in the user information.

16. The system of claim 13, wherein the first set of ranks is further based on a system feature accessed by one or more other users that share a characteristic of the user specified in the user information.

17. The system of claim 13, wherein the first set of ranks is further based on query data associated with the user specified in the user information.

18. The system of claim 13, wherein the non-conversational interface displays additional dashboard information.

19. The system of claim 13, wherein the non-conversational interface presents an interactive list that accesses the first system feature.

20. A method for comprising:

receiving user information including a user classification regarding a user accessing a system;

determining a plurality of system features that the user is permitted to access and at least one system feature the user is not permitted to access based at least in part on the user information including the user classification, wherein a first system feature of the plurality of system features is accessible through two or more user interfaces including (a) a conversational interface which allows inputting data and obtaining information using a natural language and (b) a non-conversational interface;

generating, based at least in part on the user information including the user classification, a first set of ranks including a respective rank for each respective system feature of the plurality of system features that the user is permitted to access, wherein the at least one system feature the user is not permitted to access does not include a rank in the first set of ranks, wherein a plurality of shortcuts are selectable to access different interfaces of the plurality of system features, wherein each respective feature of the plurality of system features is associated with at least one shortcut of the plurality of shortcuts that, when selected, accesses the system feature;

generating a second set of ranks including a respective rank for each respective shortcut of a subset of shortcuts, from the plurality of shortcuts, to different user interfaces of the two or more user interfaces through which the first system feature is accessible;

displaying a dashboard comprising two or more shortcuts of the plurality of shortcuts for a subset of the plurality of system features, wherein the plurality of shortcuts include at least a first shortcut that, when selected, accesses the conversational interface of the first system feature and a second shortcut that, when selected, accesses the non-conversational interface of the first system feature, wherein the two or more shortcuts are selected based at least in part on which system features are highest ranked in the first set of ranks and which shortcuts to different users interfaces are highest ranked in the second set of ranks;

concurrently with displaying the plurality of shortcuts, displaying a plurality of interface elements, each interface element of the plurality of interface elements visually indicating a type of interaction associated with a respective shortcut of the plurality of shortcuts, wherein a first interface element of the plurality of interface elements indicates that the first shortcut provides access to the conversational interface that accesses the first system feature;

wherein a second interface element of the plurality of interface elements indicates that the second shortcut provides access to the non-conversational interface that accesses the first system feature; and wherein the method is executed by at least one device comprising a hardware processor.

* * * * *

UNITED STATES PATENT AND TRADEMARK OFFICE
CERTIFICATE OF CORRECTION

PATENT NO. : 11,416,125 B2
APPLICATION NO. : 16/923985
DATED : August 16, 2022
INVENTOR(S) : Wayne et al.

It is certified that error appears in the above-identified patent and that said Letters Patent is hereby corrected as shown below:

In the Specification

In Column 11, Line 39, delete "Each" and insert -- each --, therefor.

In the Claims

In Column 18, Line 6, in Claim 20, delete "for".

Signed and Sealed this
Fourteenth Day of February, 2023

Katherine Kelly Vidal
*Director of the United States Patent and Trademark Office*